United States Patent [19]

Hawke

[11] Patent Number: 4,647,423
[45] Date of Patent: Mar. 3, 1987

[54] FUEL HANDLING APPARATUS FOR A NUCLEAR REACTOR

[75] Inventor: Basil C. Hawke, Solana Beach, Calif.

[73] Assignee: The United States of America as represented by the United States Department of Energy, Washington, D.C.

[21] Appl. No.: 526,890

[22] Filed: Aug. 26, 1983

[51] Int. Cl.⁴ ............................................. G21C 19/20
[52] U.S. Cl. .................................. 376/264; 376/268; 376/270; 414/735; 901/14
[58] Field of Search .............. 376/269, 270, 271, 268, 376/264; 414/8, 735, 744 A; 901/14, 15; 165/11 A

[56] References Cited

U.S. PATENT DOCUMENTS

| 3,066,805 | 12/1962 | Sullivan | 414/735 X |
| 3,194,742 | 7/1965 | Aubert et al. | 376/269 |
| 3,196,082 | 7/1965 | Lemesle et al. | 376/269 |
| 3,253,995 | 5/1966 | Antonsen et al. | 376/271 |
| 3,383,286 | 5/1968 | Paget | 376/269 |
| 4,018,397 | 4/1977 | Rusch et al. | 242/54 A |
| 4,096,031 | 6/1978 | Wade | 376/270 |
| 4,188,166 | 2/1980 | Moreau et al. | 414/735 |
| 4,231,419 | 11/1980 | Gugel | 165/11 A |
| 4,311,031 | 1/1982 | Schwarze | 414/744 A X |
| 4,330,369 | 5/1982 | Anderson | 376/270 X |
| 4,370,091 | 1/1983 | Gagliardi | 414/735 |

Primary Examiner—Charles T. Jordan
Assistant Examiner—Dan Wasil
Attorney, Agent, or Firm—Fitch, Even, Tabin & Flannery

[57] ABSTRACT

Fuel handling apparatus for transporting fuel elements into and out of a nuclear reactor and transporting them within the reactor vessel extends through a penetration in the side of the reactor vessel. A lateral transport device carries the fuel elements laterally within the vessel and through the opening in the side of the vessel, and a reversible lifting device raises and lowers the fuel elements. In the preferred embodiment, the lifting device is supported by a pair of pivot arms.

7 Claims, 7 Drawing Figures

FUEL HANDLING APPARATUS FOR A NUCLEAR REACTOR

The Government has rights in this invention pursuant to Contract No. DE-AT03-76SF70046 awarded by the U.S. Department of Energy.

BACKGROUND OF THE INVENTION

The present invention relates generally to nuclear reactors and more particularly to an improved fuel handling apparatus for a nuclear reactor.

Certain types of nuclear reactors, such as high temperature, gas-cooled reactors (HTGR), typically employ an array of fuel elements which form a core within the interior of the reactor. The core is enclosed within a reactor vessel. It is desirable to remove fuel elements from the reactor core periodically and replace them with new fuel elements. It may also be desirable to shift fuel elements to different positions within the reactor core.

Elongated fuel elements of hexagonal cross-section are commonly stacked upright to form the core. This general type of core construction is described in U.S. Pat. No. 3,383,286 to Paget, which is incorporated herein by reference.

It is known for a device for manipulating fuel elements within a reactor vessel to access the reactor core through an opening in the top of the vessel. In some relatively recently developed reactors, it has been found desirable to utilize the space above the reactor core for heat exchange apparatus and the like, without leaving space for access to the core from above by fuel handling apparatus. With this type of arrangement, it is desirable to access the core through an opening in the side of the reactor vessel.

The various fuel elements are distributed in predetermined locations and typically abut one another at their sides. Accurate placement is necessary in order to position the elements in their locations. Accordingly, it is desirable that fuel handling apparatus be capable of operating with a high degree of precision. In addition, it is desirable that the apparatus lift and lower the elements along vertical paths to avoid excessive friction with adjacent elements.

Friction with adjacent elements may require downward forces in excess of the gravitational force exerted on the element to bring the element to a desired elevational location. Accordingly, the fuel element handling apparatus should be capable of exerting downward force onto the elements as well as upward force.

The vessel herein may be required to support a relatively high pressure differential between its interior and its exterior. To lessen interference with the structure of the vessel, it is desirable that a single penetration of relatively small diameter be sufficient to provide access to the entire core for the fuel handling apparatus. Accordingly, the fuel handling apparatus should fit through a relatively small penetration and include means for accessing fuel elements at various locations within the vessel, and should be capable of carrying a fuel element through a relatively small penetration. In addition, it is desirable that the fuel handling apparatus be capable of transporting fuel elements over relatively long distances both laterally and vertically so that both removal of spent fuel elements from the vessel to a desired remote location and, transportation of new fuel elements from a desired remote location to the interior of the vessel may be accomplished.

It is further desirable that the fuel handling apparatus be adequately sealed to the vessel so that escape of radioactive material from the vessel is avoided or minimized during operation of the apparatus.

The radioactive environment within the vessel excludes certain types of mechanisms from use within the vessel. Hydraulic systems, for example, may not be suitable due to breakdown of hydraulic fluids in the radioactive environment.

There is a need for a fuel handling apparatus which is acceptable for use in a reactor having its refueling port located on the side of the vessel rather than in the top.

SUMMARY OF THE INVENTION

In accordance with the present invention, there is provided fuel handling apparatus which is extendable through a refueling port or penetration in the side of a reactor vessel. The apparatus includes a housing defining a longitudinal axis extending through the penetration, reversible lifting means for raising and lowering fuel elements, first and second pivot arms for enabling manipulation of the lifting means, a movable support member for supporting the first and second arms, and lateral transport means for moving the support member axially of the housing.

In the illustrated embodiment, a grapple head of known design for releasably supporting a fuel element from above the fuel element is supported by the lifting means. The lifting means is rigidly mounted on the second arm, which is pivotal about a horizontal axis through the first arm, so that it may be pivoted between a first position enabling lifting and lowering of the fuel elements and a second position for enabling a fuel element to be transported through the penetration. The first arm pivots about a vertical axis through the support member to enable the fuel handling apparatus to access various locations in the array of fuel elements within the reactor vessel by permitting horizontal movement of the lifting means transversely of the direction of motion of the lateral transport means. The preferred lateral transport means comprises a telescoping member and means for extending or retracting the telescoping member.

Accordingly, it is a general object of the present invention to provide fuel handling apparatus which is extendable for operation through a penetration in the side of a nuclear reactor vessel.

It is a further object of the present invention to provide fuel handling apparatus which enables lifting means to be inserted through a relatively small opening and to be positioned above any of a plurality of fuel elements making up the core of the reactor.

It is an additional object of the present invention to provide fuel handling apparatus including lifting means which apply either upward or downward force to a fuel element and which may pass through a relatively small penetration in the side of a reactor vessel while supporting a fuel element.

It is an additional object of the present invention to provide fuel handling apparatus for transporting fuel elements both laterally and vertically over relatively long distances.

DETAILED DESCRIPTION OF THE PREFERRED EMBODIMENT

Figure 1:
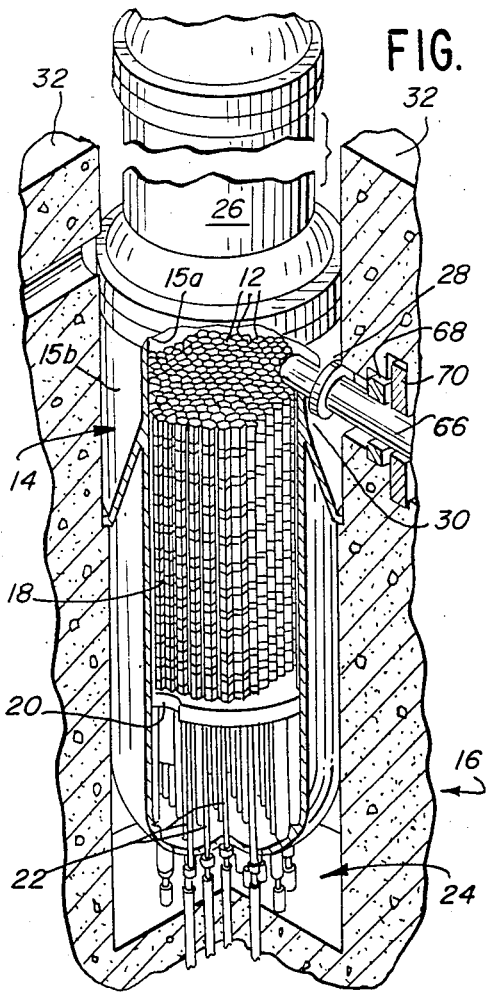
FIG. 1 is a perspective view of a nuclear reactor with which the fuel handling apparatus of the present inven

The present invention relates generally to fuel handling apparatus 10 (FIG. 2) for transporting fuel elements 12 into a nuclear reactor vessel 14 and withdrawing them therefrom, and for positioning fuel elements 12 in predetermined locations within the vessel 14. Referring particularly to FIG. 1, there is shown a high temperature gas-cooled reactor (HTGR) 16 which includes a vessel 14 defining an enclosed interior and a core 18 made up of a plurality of individual fuel elements 12 resting upon a support platform 20 within the interior of the vessel. The vessel includes inner and outer walls 15a and 15b respectively. A plurality of control rods 22 which may be inserted into the core 18 from beneath the support platform 20 are driven by control rod drives 24. An upper portion 26 of the vessel 14 encloses heat transfer apparatus (not shown). The vessel 14 includes a penetration or refueling port 28 which provides access to the interior of the vessel for the fuel handling apparatus 10 through the side 30 of the vessel. The vessel is surrounded by thick walls 32 made of concrete or the like which shield the surrounding environment from radiation emitted by the reactor 16.

Figure 2:
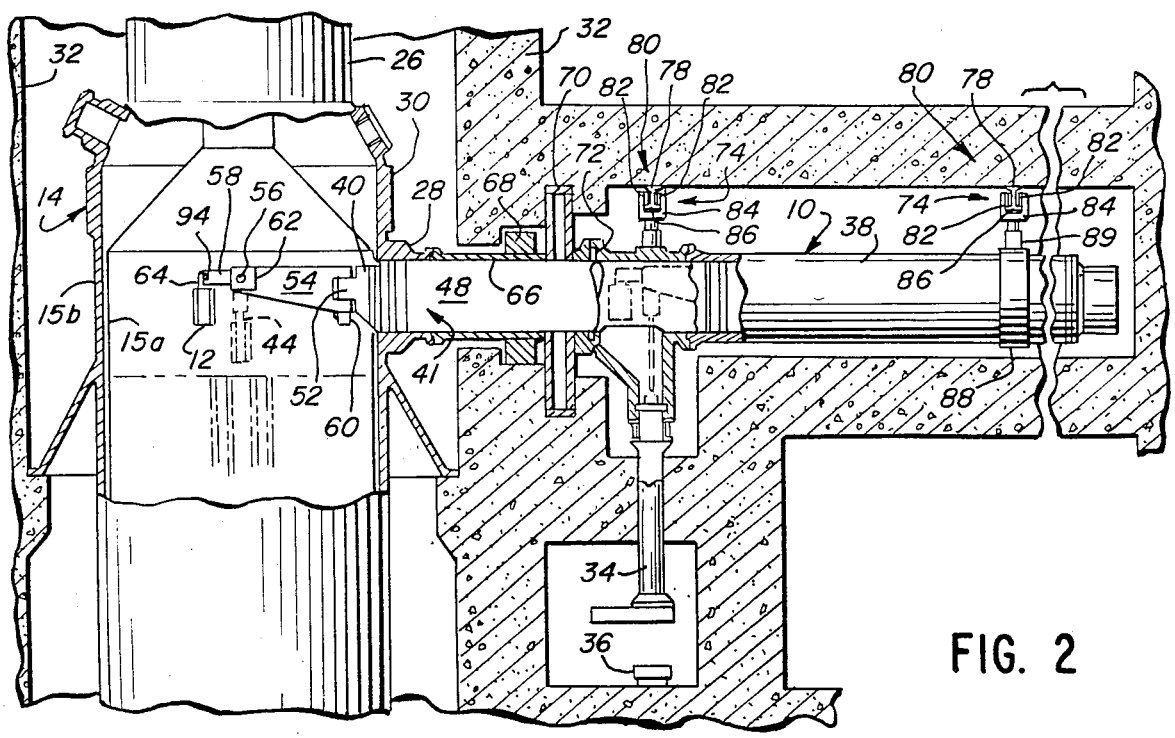
- FIG. 2 is a longitudinal sectional elevational view of fuel handling apparatus in accordance with the present invention, shown in combination with the nuclear reactor of FIG. 1.
Figure 4:
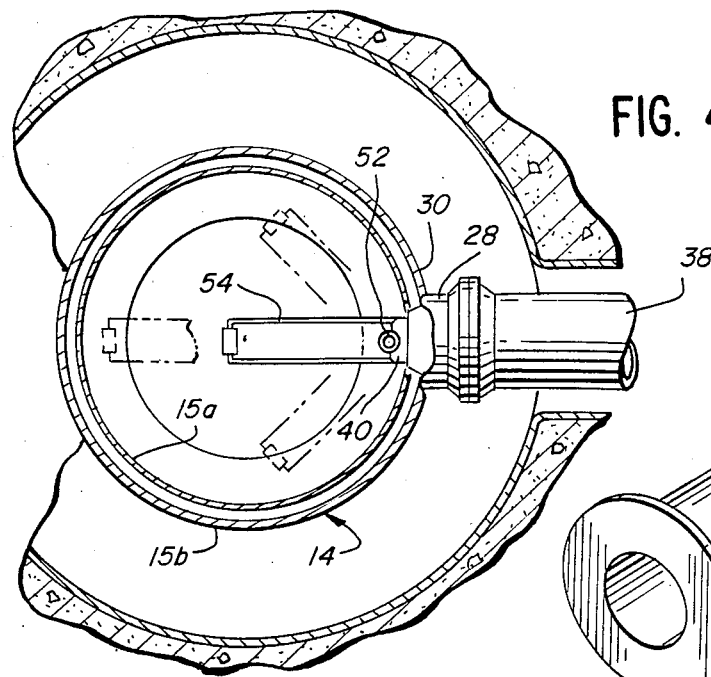
FIG. 4 is a plan view of a portion of the fuel handling apparatus of FIG. 2.

Referring now to FIG. 2, there is shown a transfer chute 34 for receiving spent fuel elements 12 and a conveyor 36 located at the terminal end of the chute 34. Spent fuel elements may be removed from the core 18 and lowered through the transfer chute 34 to the conveyor 36. New fuel elements may be brought to the bottom of the transfer chute 34 by the conveyor 36, lifted through the transfer chute 34 and placed in the core 18 by means of the fuel handling apparatus 10.

The fuel handling apparatus 10 includes an outer support housing 38 defining a longitudinal axis extending through the penetration 28 and a support member 40 mounted for motion longitudinally or axially of the housing 38 within the housing. Lateral transportation of the support member 40 through the housing 38 is accomplished by longitudinal movement of the support member 40 within the housing 38 by lateral transport means 41.

Heretofore, no known device has provided means for transporting fuel elements through a relatively small penetration in the side of a reactor vessel while also providing means for applying both upward and downward force to fuel elements within the vessel.

In accordance with the present invention, the fuel handling apparatus 10 includes reversible lifting means 42 (FIG. 3) which are pivotal between a first orientation wherein the lifting means 42 may be used to lift or lower fuel elements 12, and a second orientation wherein the lifting means and a fuel element 12 supported thereby may be withdrawn from the vessel 30 through a relatively small penetration 28. The lifting means 42 preferably include an extendable member 44 which can positively transmit either upward or downward force to the fuel element 12. Grapple means 64 are mounted on the end of the extendable member 44 for detachably supporting a fuel element 12.

Because the various fuel elements 12 are positioned directly adjacent other fuel elements 12 in the core 18 with their adjacent sides oriented vertically, it is desirable that the fuel handling apparatus 10 be capable of lifting and lowering the elements vertically. Accordingly, the fuel handling apparatus 10 should include means for positioning the lifting means 42 directly above any of the fuel elements 12. In addition, it is desirable that this be accomplished by fuel handling apparatus 10 extending through a single, relatively small penetration 42, and that the fuel handling apparatus 10 be capable of carrying the fuel elements 12 through this penetration and over a relatively long distance laterally to the transfer chute 34.

In accordance with the present invention, the lateral transport means 41 preferably comprises a telescoping member 48 and suitable means (not shown) which may be of known design for extending and retracting the telescoping member 48 to transport the support member 40 laterally along the axis of the housing 38 to move the lifting means 42 between a first position within the vessel 14 and a second position within the housing 38 above the transfer chute 34. The support member 40 includes first pivot means 52 defining a vertical axis for pivotal mounting of a first arm 54. The first arm 54 includes second pivot means 56 defining a horizontal axis for pivotally supporting the second arm 58. The second arm 58 rigidly supports the lifting means 42. Suitable means 60 and 62 are provided for pivoting the first and second arms 54 and 58 respectively about the respective first and second pivot means 52 and 56. The lifting means 42 may be positioned above any desired fuel element 12 by a combination of longitudinal movement of the support member 40 and pivoting of the first arm 54 about the vertical axis defined by the first pivot means 52. At any position of the support member 40 within the vessel, the first arm 54 provides access to a range of positions transversely displaced from the longitudinal axis of the housing 38.

Figure 3:
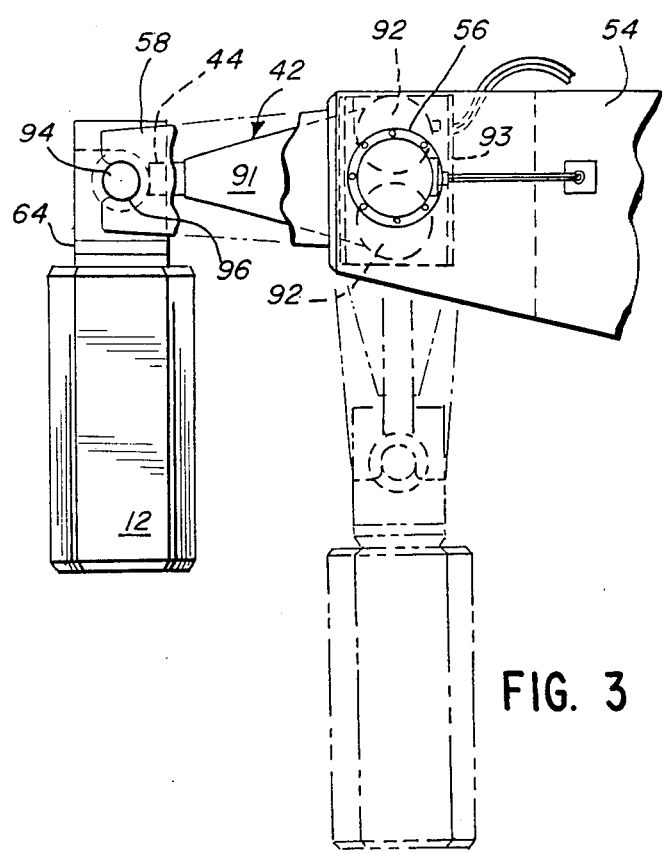
FIG. 3 is a detailed elevational view of a portion of the fuel handling apparatus of FIG. 2.

When the apparatus 10 is used for moving a fuel element 12 vertically, the second arm 58 and lifting means 42 are placed in a first (vertical) position, shown in broken lines in FIGS. 2 and 3, and the extendable member 44 of the lifting means 42 is extended or retracted to lower or lift the element 12 as desired. When the element 12 is to be transported laterally through the penetration 28 or along the interior of the housing 38, the second arm 58 is placed in its second (approximately horizontal) position, shown in solid lines in FIGS. 2 and 3, with the fuel element 12 suspended in an upright position from the grapple means 64. In this position, the lifting means and fuel element 12 may pass through the penetration 28.

The dimension of the lifting means 42 is greatest along its direction of movement. Accordingly, if the lifting means 42 were maintained in its first position with a fuel element 12 suspended therebeneath during passage through the penetration 28, a larger penetration would be required. Mounting the lifting means 42 in an arm 58 which may be pivoted from the vertical position prior to transportation through the penetration enables the lifting means 42 and fuel element 12 supported thereby to travel through a relatively small penetration 28.

In the illustrated embodiment, movement of the lifting means 42 in a direction parallel to the axis of the housing 38 is accomplished by movement of the support member 40 longitudinally of the housing. Horizontal movement of the lifting means 42 transversely of the axis of the housing 38 may be accomplished by pivoting the first arm 54 about the vertical axis through the support member. Accordingly, the lifting means may be positioned directly above any location within the core for vertical access to such location by a combination of longitudinal movement of the support member 40 and pivotal movement of the first arm 54 about the first pivot means 52. Herein, the lifting means 42 are rigidly mounted on or within the second arm 58. The extendable member 44 of the lifting means 42 preferably comprises a storable tubular extendable member (STEM) which can be loaded either in tension or compression to apply either upward or downward force to a fuel element 12 during operation.

Turning now to a more detailed description of the preferred embodiment of the present invention, the horizontal axis defined by the support housing 38 preferably extends through the center of the penetration 28. To avoid requiring the fuel handling apparatus 10 to be positioned directly adjacent the penetration 28, a tubular connector member 66 extends therebetween when the fuel handling apparatus 10 is in position for use, as shown in FIG. 2. The connector member 66 is supported by an annular support 68.

The fuel handling apparatus 10 is preferably movable so that it can be removed from the position shown in the figures. To prevent or restrict release of radioactive matter or of radiation from the connector member 66 when the fuel handling apparatus 10 is not in position, an isolation valve 70 is provided at the outer end of the connector member 66 and may be closed when the fuel handling apparatus 10 is not in position. The valve 70 may be opened when the apparatus 10 is in position to enable access to the interior of the vessel 14.

When the fuel handling apparatus 10 is in position, and the isolation valve 70 is open, an enclosed interior space is defined by the adjacent interiors of the support housing 38 of the fuel handling apparatus 10, the connector member 66, and the vessel 14. To prevent emission of radiation or contaminated matter from this interior space, suitable sealing means 72 such as inflatable seals are provided at the interfaces between the fuel handling apparatus 10 and the isolation valve 70.

To facilitate transportation of the fuel handling apparatus 10 into and out of position, it is preferably supported movably. To this end, in the illustrated embodiment, suspension means 74 are provided for supporting the fuel handling apparatus 10 from above. The suspension means 74 herein comprise a pair of parallel I-beams 78 supported by a wall 32 above the housing 38, and two pair 80 of rollers 82, each pair 80 being rotatably mounted on opposite sides of an associated clevis 84 which is connected to the housing 38 and supported by the upper surface of the lower flange 86 of an associated I-beam so that each pair may roll along the length of its associated I-beam with one roller on each side of the web 86 of the I-beam. An annular support 88 extends about the housing 38 beneath each clevis 84 and is connected to its associated clevis by a link 89. It will be appreciated that various other means for movably supporting the fuel handling apparatus may be suitable.

To provide a barrier to radiation during operation of the reactor in addition to the isolation valve, a suitable plug of known design may be removably inserted within the penetration 28 or connector member 66.

Figure 5:
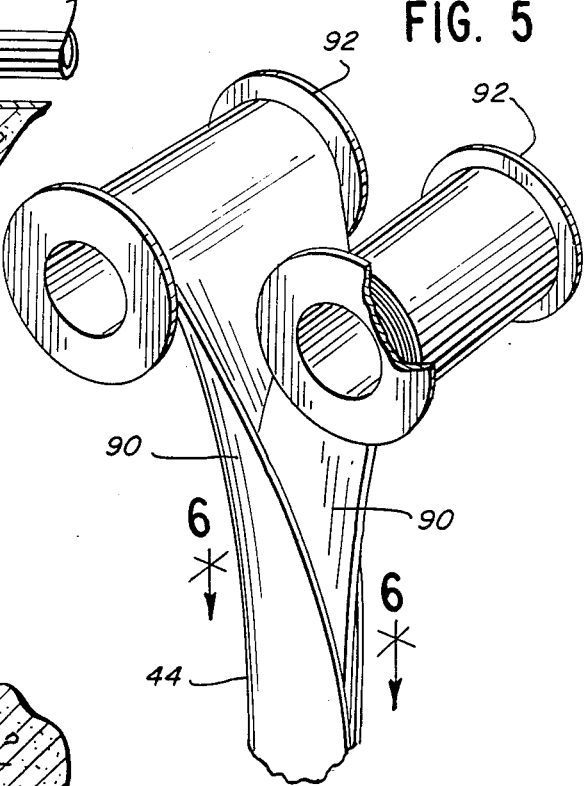
FIG. 5 is an isometric view, partly diagrammatical, illustrating the operation of a BI-STEM device.
Figure 6:
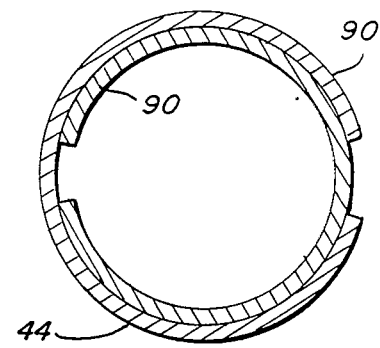
FIG. 6 is a transverse sectional view taken substantially along line 6—6 in FIG. 5 and looking in the direction of the arrows.

As stated above, the preferred lifting means 42 includes a storable tubular extendable member (STEM) 44 which may be loaded longitudinally either in tension or in compression to apply force to fuel elements 12 during handling thereof. In the illustrated embodiment, the lifting means 42 employs two cooperating extendable members forming a single STEM and is known as a "BI-STEM" device. Referring particularly to FIGS. 5 and 6, the BI-STEM comprises two ribbons 90 made of metal or another suitable material which are stored on spools or reels 92. To extend the BI-STEM into a generally linear configuration, the ribbons 90 are curved or bent into overlapping, transversely curved configurations to form a single elongated, relatively rigid member 44 of generally circular cross section. The BI-STEM device is of known design. Devices of this type are obtainable from Spar Aerospace Products, Ltd. The BI-STEM device includes suitable means 91 for imparting curvature to the respective ribbons 90 and suitable drive means 93 for rotating the reels to extend or retract the extendable member 44.

The grapple means 64 preferably comprises a grapple head which releasably supports a fuel element 12 by inserting a probe into a bore in the top of the fuel element and engaging lands formed on the internal surface of the bore as described in U.S. Pat. No. 3,383,286 to Paget. To enable the second arm 58 to pivot about the horizontal axis 56 with a fuel element 12 suspended from the grapple head 64 in an upright position, the grapple head is preferably pivotally supported by a pivot pin 94 extending through the end of the BI-STEM. In the illustrated embodiment, slots 96 are formed in the end of the second arm and when the STEM is fully retracted, the pivot pin 94 is pulled into the slots so as to be pivotally supported on the end of the second arm 58.

In the alternative, it may be desirable to pivot the fuel element 12 into a horizontal orientation or another orientation other than the upright orientation illustrated to facilitate transportation of the fuel element 12 through the penetration 28. Accordingly, it may be desirable to provide means for constraining the grapple head 64 against pivoting with respect to the second arm 58. It will be appreciated that by allowing the fuel element 12 to be suspended in an upright position, as in the preferred embodiment, the magnitude of the moment which must be applied to the second arm 58 to pivot it upward to its second position need not be as great as would be required if the fuel element were to be angularly displaced simultaneously with the pivoting of the second arm.

Figure 7:
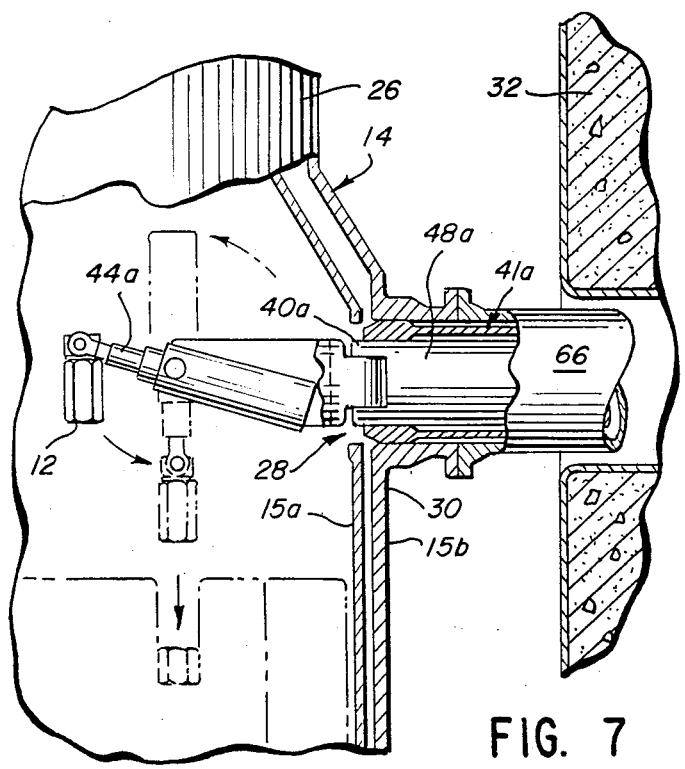
FIG. 7 is a longitudinal sectional elevational view of fragmentary fuel handling apparatus constructed in accordance with an alternative embodiment of the present invention, shown with portions broken away for clarity.

Turning now to FIG. 7, there is shown an alternative embodiment of the present invention wherein a telescoping lifting member 44a is used instead of a STEM device as described above. Otherwise, the fuel handling apparatus illustrated in FIG. 7 is essentially the same as that described above, and includes lateral transport means 41a comprising a telescoping member 48a having a support member 40a on its end.

From the foregoing, it will be appreciated that the present invention provide a novel fuel handling apparatus for a nuclear reactor. While a preferred embodiment is illustrated and described herein, there is no intent to limit the invention to this or any other particular embodiment. The scope of the invention is defined by the spirit and language of the appended claims.

What is claimed is:

1. Fuel handling apparatus for operation through an opening in the side of a reactor vessel having a plurality of fuel elements disposed in an array within the vessel, the apparatus comprising:

a support housing for affixation to an exterior portion of said vessel, said housing enclosing an interior space having a generally horizontal longitudinal axis;

a support member mounted for motion longitudinally of said housing within said housing;

a first arm supported by said support member and pivotal about a vertical axis through said support member;

a second arm supported by said first arm and pivotal about a horizontal axis through said first arm;

means for pivoting said first and second arms about their respective axes;

reversible extendable lifting means fixedly supported by said second arm for positively moving said fuel elements upward and downward, said lifting means including a storable tubular extendable member comprising at least one ribbon which may be compactly stored on a reel and which may be extended into an elongated, relatively rigid configuration;

grapple means supported by said lifting means for releasably connected said lifting means to said fuel elements; and lateral transport means for moving said support member longitudinally of said housing;

said second arm being pivotal between a first position enabling lifting or lowering of fuel elements by said lifting means and a second position enabling transport of a fuel element suspended from said second arm through said opening in an upright position;

said first arm being movable to a plurality of different positions whereby pivoting of said first arm about said vertical axis and movement of said support member longitudinally of said housing enables said reversible lifting means to be positioned directly above any of said fuel elements;

said support member being movable by said lateral transport means between protracted positions enabling said lifting means to be positioned within the reactor vessel directly above respective said fuel elements and retracted positions enabling said lifting means to be positioned within said housing, outside of the vessel.

2. Apparatus in accordance with claim 1 further comprising suspension means for supporting said support housing from above.

3. Apparatus in accordance with claim 2 wherein said suspension means comprises a fixed track and means fixed to said support housing and movably supported by said track to enable movement of said fuel handling apparatus along said track.

4. Apparatus in accordance with claim 1 wherein said second arm includes means for supporting said grapple head when said second arm is in said second position.

5. Apparatus in accordance with claim 1 wherein said lateral transport means comprises a telescoping member attached to said support member at one end and extendable longitudinally of said housing.

6. Apparatus in accordance with claim 1 further comprising a transfer chute extending downwardly beneath said housing, said transfer chute being positioned so that fuel elements may be raised and lowered therethrough, and conveyor means located at the bottom of said transfer chute for moving fuel elements into position for access by said lifting means through said transfer chute, or moving them to a remote location after being lowered through said transfer chute by said lifting means.

7. Apparatus in accordance with claim 1 wherein said coupling means includes an elongated tubular connecter member extending outwardly from said penetration.

* * * * *

UNITED STATES PATENT AND TRADEMARK OFFICE
CERTIFICATE OF CORRECTION

PATENT NO. : 4,647,423

DATED : March 3, 1987

INVENTOR(S) : Basil C. Hawke

It is certified that error appears in the above-identified patent and that said Letters Patent is hereby corrected as shown below:

Column 7, line 37, change "connected" to --connecting--.

Signed and Sealed this

Twenty-sixth Day of January, 1988

Attest:

DONALD J. QUIGG

*Attesting Officer*  *Commissioner of Patents and Trademarks*